United States Patent [19]
Lu

[11] 3,978,885
[45] Sept. 7, 1976

[54] UNBALANCE PRESSURE ACTUATOR FOR A FLOW CONTROL APPARATUS HAVING NOISE AND VIBRATION REDUCING ARRANGEMENT THEREON

[75] Inventor: Chien Shiong Lu, Glen Mills, Pa.

[73] Assignee: Westinghouse Electric Corporation, Pittsburgh, Pa.

[22] Filed: Mar. 28, 1975

[21] Appl. No.: 563,424

[52] U.S. Cl.............................. 137/560; 251/319; 60/657
[51] Int. Cl.² ......................................... F16K 19/00
[58] Field of Search.................... 137/560; 251/319; 60/657, 660; 91/416

[56] References Cited
UNITED STATES PATENTS
623,935    4/1899    Wilson et al. ...................... 137/560

*Primary Examiner*—Harold W. Weakley
*Attorney, Agent, or Firm*—G. H. Telfer

[57] ABSTRACT

A flow control apparatus which has an external conduit for conducting fluid from a region having a pressure therein higher than the pressure immediately beneath a valve plug into an internal cavity disposed within the valve plug is provided with an unbalance actuator for isolating the cavity from the region when, for any reason, the pressure within the cavity exceeds the pressure within the region.

5 Claims, 5 Drawing Figures

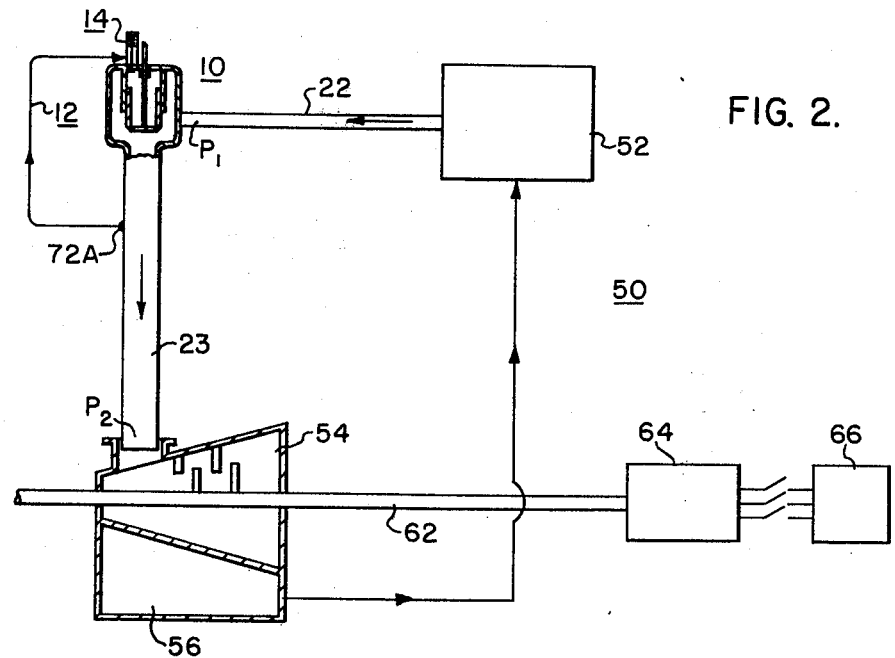
FIG. 2.
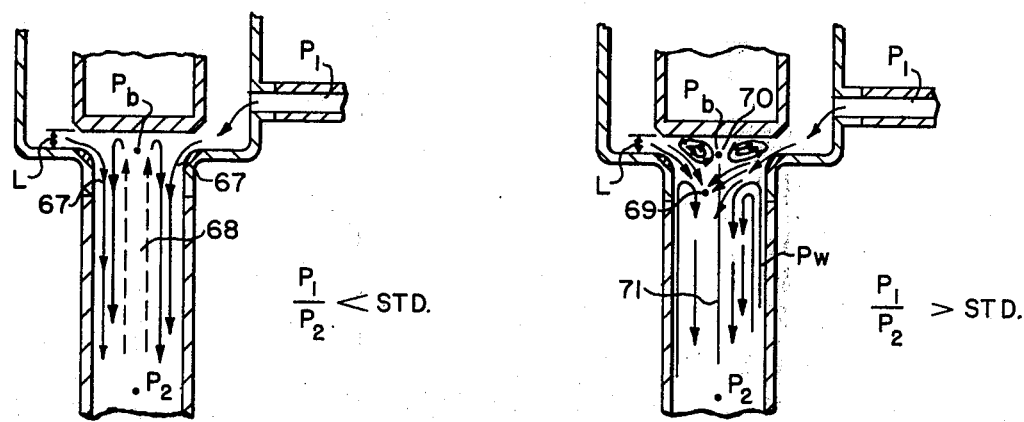
FIG. 3A.
PRIOR ART
FIG. 3B.
PRIOR ART

UNBALANCE PRESSURE ACTUATOR FOR A FLOW CONTROL APPARATUS HAVING NOISE AND VIBRATION REDUCING ARRANGEMENT THEREON

BACKGROUND OF THE INVENTION

1. Field of the Invention

This invention relates to flow control apparatus, and in particular, to a flow control device having an unbalance pressure actuator located in a noise and vibration reduction and control arrangement.

2. Description of the Prior Art

In general, a steam turbine power plant, whether fossil fuel or nuclear, comprises a series-connected arrangement of at least a steam generator element, a turbine element, and a condenser element. It is, of course, well known that the turbine element converts the energy contained within high pressure and high temperature motive steam to rotational mechanical energy which is transmitted by a common shaft to an associated electrical generator element. Suitable flow control apparatus, including at least one control valve, is connected within the conduit arrangement disposed between the steam generator and the turbine element. The control valve, in addition to providing steam interdiction capability in the event of a system malfunction, has as its function the regulation of the steam flow to the turbine element from the steam generator element.

The steam conducted into the turbine element enters the turbine through what is known in the art as an admission arc, the arc being located in the turbine immediately preceding the first row of stationary blade elements mounted therein. It is known in the art to provide a turbine element having disposed therein a plurality of admission arcs, each arc being said to be a partial admission arc. If a turbine is provided with such a plurality of partial admission arcs, there is disposed in the steam line between each admission arc and the steam generator element a suitable flow control device, such as a control valve.

When low load conditions are imposed upon the entire generating facility, such as during off-peak periods, it is common practice to reduce the mass flow of motive fluid passing from the steam generator to the turbine element. In a single admission arc machine, the reduction in mass flow is accomplished by modulating the position of a valve plug within the control valve relative to its associated valve seat. Modulation of the valve plus reduces the pressure of the motive fluid entering the turbine, and, since the admission area of the single admission arc turbine remains constant, modulation of the valve thereby reduces the flow rate entering the turbine. Of course, if a partial admission arc machine is utilized, reduction of mass flow rate into the turbine can be accomplished by sequentially reducing the area available to the flow, that is, by utilizing only a predetermined number of the plurality of admission arcs available. Furthermore, the pressure of the motive fluid entering each of the admission arcs is regulated by modulating the location of the control valve plug governing the flow of motive fluid into each admission arc.

It has been found however, that during low load conditions, when the ratio of the valve inlet pressure relative to the turbine inlet pressure is high, excessive noise and vibration levels occur within the control valve. Such excessive noise and vibration levels are mainly due to vortex excitation forces imposed upon the bottom of the control valve plug and by the direct collision of fluid flow stream lines beneath the control valve plug.

With the valve plug in a modulating position relative to its associated valve seat, the motive fluid flow through the valve must, of necessity, pass through the channel defined between the plug and the seat. For a given "lift" or clearance between the plug and the seat, the high pressure ratios between valve inlet and turbine inlet which occur during low load conditions and the associated downstream flow field at these pressure ratios cause the high velocity fluid which enters the downstream piping beneath the control valve plug to separate from the boundaries of the downstream piping and to collide underneath the control valve plug. The collision of the fluid stream lines creates a closed vortex cavity underneath the valve plug, the cavity generally being asymmetric relative to an axis extending through the downstream conduit. Such a closed vortex cavity causes the motive fluid confined therein to pound upon the bottom of the control valve plug. This pounding by the turbulent fluid trapped within the closed vortex cavity causes vibration and pulsating forces to be imposed upon the control valve plug. Further, the collision of the stream lines beneath the control valve plug generates excessive noise levels.

When the pressure ratio between the valve inlet and the turbine inlet is at a lower value, or when the clearance or lift between the valve plug and valve seat is increased, the fluid flow stream lines passing through the channel between the valve plug and the valve seat generally flow along the boundaries of the piping downstream of the valve. As a result, it is established that an increase in the static pressure occurs within the conduit approximately five pipe diameters downstream of the point of entry of the fluid that is, downstream of the channel between the valve plug and the valve seat. The static pressure downstream is greater than the static pressure immediately beneath the valve plug. This difference in static pressure causes a recirculating back flow of fluid moving in an upstream direction toward the control valve plug in the central portion of the flow. This back flow is advantageous in that it avoids the above-mentioned pounding and colliding effects. Although the interaction of the recirculating back flow and the high velocity inlet steam causes some shear noise and some vibration for the lower inlet pressure ratios or for higher lift, these effects are not deleterious.

However, as the valve-inlet-to-turbine inlet pressure ratio increases, the direct collision of the fluid stream lines beneath the valve plug prevent the back flow of recirculating fluid from occurring. Thus, at the higher inlet pressure ratios the velocity head of the inlet fluid is not dissipated by the viscous interaction between it and the recirculated back flow.

For the situation of steam line collision it may be said, in general, that the pressure at the inlet of the valve is always greater than the pressure approximately five diameters downstream of the plug. If this were not the case there could be no flow through the valve. It may also be generally said that the pressure downstream of the valve is greater than the pressure along the walls of the outlet piping immediately adjacent the valve seat.

In the copending application of D. Q. Hoover, Ser. No. 563,422, filed Mar. 28, 1975 filed concurrently herewith, the fact that the downstream pressure is greater than the pressure along the sidewalls of the piping is utilized to cause separation between the colliding stream lines. Suitable piping means are provided external to the valve to conduct motive fluid from the higher pressure region downstream of the valve plug into and through the control valve. Thus, the back flow which naturally occurs in the downstream conduit but which was cut off by the collision of the influent stream lines is provided an alternate route through the external piping. The fluid conducted from the higher pressure region downstream of the valve plug is introduced through openings in the plug directly into the region immediately beneath the valve plug. Since the pressure of the downstream fluid is greater than the pressure along the side walls of the outlet conduit, the inlet main streams are forced apart by the pressurized fluid, thus opening the asymmetric closed vortex and reducing vibration excitation of the plug. At the same time, shear noise is reduced by preventing collision of the inlet main streams.

However, there are situations when the pressure beneath the valve plug within the vortex cavity exceeds the pressure downstream in the conduit. In this case, a counter flow through the valve plug to the downstream region will occur. If this counter flow exists, the flow of motive fluid to the turbine will be interdicted and a possible turbine overspeed condition, with the attendant possibility of turbine damage, can occur. In order to prevent the deleterious effects of a counter flow through the control valve, an unbalanced pressure actuator valve embodying the teachings of this invention is provided within the external conduit line.

SUMMARY OF THE INVENTION

According to the teachings of this invention, a pressure actuated check valve is provided to interdict flow in an external conduit utilized to conduit fluid from a high pressure region into an internal cavity provided in the plug of a control valve. The check valve is advantageously disposed at any convenient position in the external bypass conduit or within the control valve and is activated when there exists a pressure within the internal cavity of the plug that exceeds the pressure in the downstream region. Such a pressure unbalance activates the check valve to isolate the plug cavity from the downstream region.

It is an object of this invention to provide a pressure activated check valve disposed in a conduit conducting fluid from a pressurized downstream region into an internal cavity in a valve plug and to isolate the valve plug cavity from the downstream region in the event that the pressure within the cavity exceeds the pressure in the downstream region.

BRIEF DESCRIPTION OF THE DRAWINGS

The invention will be more fully understood from the following detailed description of the preferred embodiment thereof taken in connection with the accompanying drawings, in which:

FIG. 2 is a diagrammatic view of a steam power generating facility having disposed therein a flow control apparatus embodying the teachings of this invention;

FIGS. 3A and 3B ar diagrammatic views of the prior art control values illustrating the phenomena causing excessive vibration and noise levels; and, FIG. 4 is an expanded view of a portion of FIG. 1 showing a pressure-unbalance actuator disposed in the flow control apparatus embodying the teachings of this invention.

DESCRIPTION OF THE PREFERRED EMBODIMENT

Figure 4:
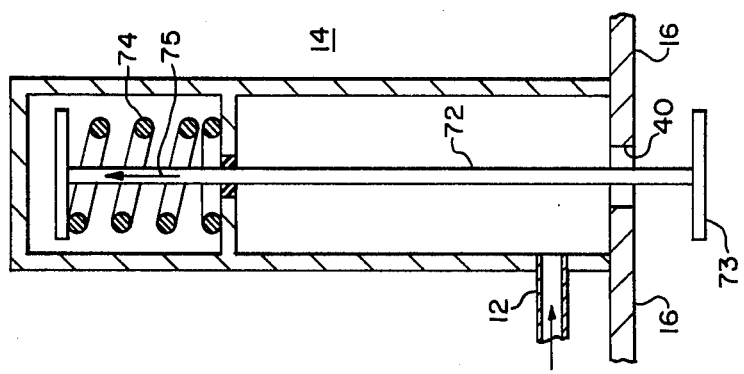

Throughout the following description similar reference characters refer to similar elements in all Figures of the drawings.

Figure 1:
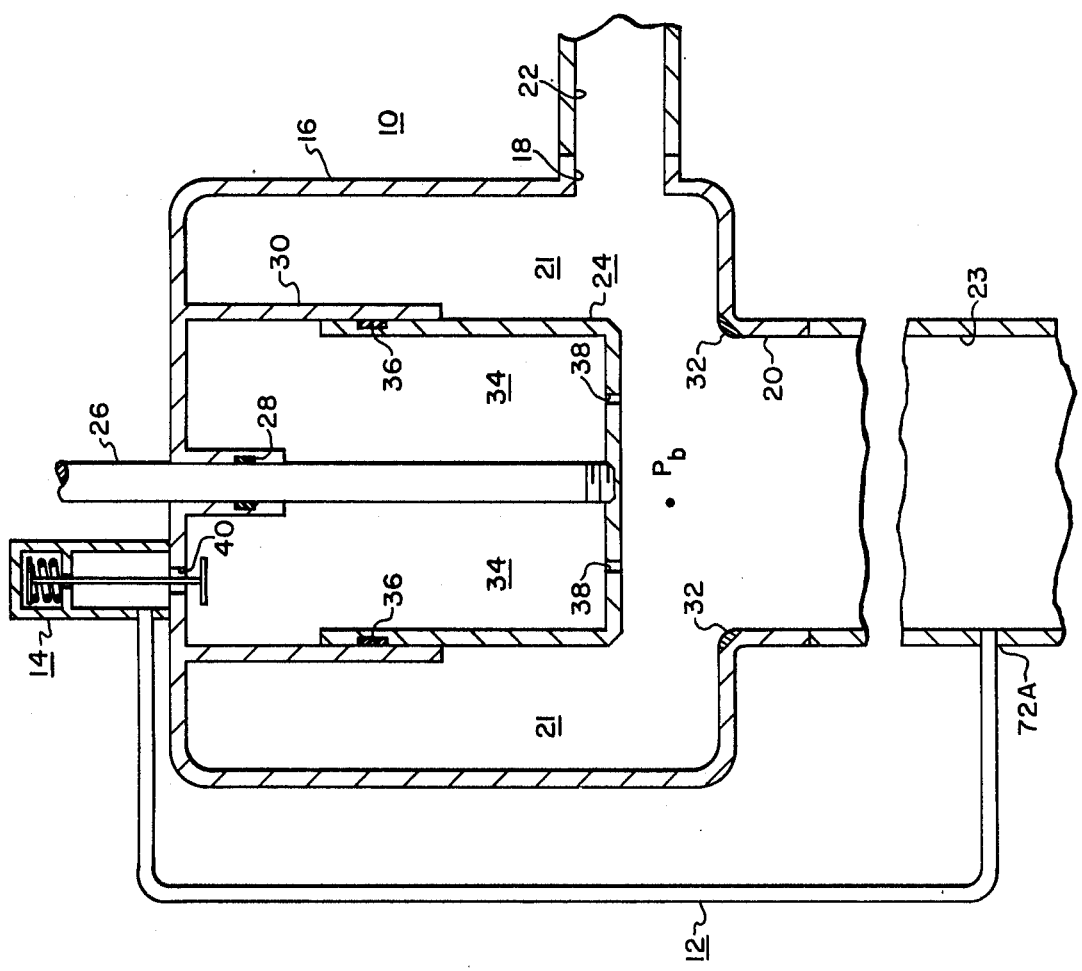
FIG. 1 is an elevational view, entirely in section, of a flow control apparatus embodying the teachings of this invention.

Referring first to FIG. 1, an elevational view, entirely in section, of a flow control apparatus 10 having an external recirculating conduit 12, which will be described more fully herein, and a pressure unbalance actuator valve 14 provided within the recirculating conduit 12 and embodying the teachings of this invention is shown. The flow control apparatus 10, commonly a control valve, comprises a valve housing 16 having an inlet port 18, an outlet port 20, and an annular valve chamber 21 defined therein. The inlet port 18 is connected to an inlet conduit 22 while the outlet port 18 is connected to an outlet conduit 23.

Movably disposed for reciprocal movement within the housing 16 is a plug member 24 securely attached to a valve shaft 26. The shaft 26 extends through the housing 16 to engage an external actuator (not shown) and seal members 28 are provided to insure a leak proof passage for the shaft 26 out of the housing 16. A substantially cylindrical plug guide member 30 is provided on the interior of the housing 16 and serves to guide the plug 24 toward a valve seat 32 disposed circumferentially about the outlet port 20 within the housing 16. When abutting relationship is established between the plug 24 and the seat 32 the inlet port 18 is completely isolated from the outlet 20 and passage of any fluid therebetween is prohibited.

As seen in FIG. 1, the plug 24 is a substantially cup-shaped member defining a hollow central cavity 34 therein. Seals 36 are provided between the sidewalls of the plug 24 and the plug guide 30 to prevent communication between the valve chamber 21 and the central cavity 34 of the valve plug 24. An array of openings 38 are provided in the bottom of the plug 24 for reasons that will become more apparent therein. An opening 40 is provided in the cover of valve 10, the external conduit 12 communicating through the opening 40 with the cavity 34. The unbalance actuator 14 is mounted on the valve housing 16 next adjacent to the internal chamber 34, although it is to be understood that the actuator 40 may be disposed at any location so as to accomplish its assigned function, which will be described herein.

Referring to FIG. 2, a diagrammatic view of a steam turbine power plant 50 having a flow control apparatus 10 embodying the teachings of the invention disposed therein is shown. The power plant 50 comprises a series-connected, closed-loop arrangment having at least a steam generator element 52 connected to a turbine element 54 and a condenser element 56. As seen in FIG. 2, the flow control apparatus 10 is disposed between the steam generator element 52 and the turbine element 54. The inlet conduit 22 is connected to the steam generator element 52 and the outlet conduit 23 is connected to the inlet of the turbine 54.

It is to be understood that the power plant 50 shown in FIG. 2 is a generalized version of a typical steam power generation facility and that the elements described above have functional equivalents that are found in both a nuclear or a fossile fuel power generation station. As shown diagrammatically in FIG. 2, the turbine element 54 is connected by a common shaft 62 to a generator element 64. As will be apparent to those skilled in the art, the turbine element 54 converts the high temperature high pressure energy of the motive steam to rotational mechanical energy which is transmitted by the shaft 62 to the generator element 64 which in turn converts the mechanical energy into electrical energy utilized by an associated electrical load 66.

During low load conditions, such as off-peak hours of operation, it is desirable to reduce the mass flow rate of motive fluid passing from the steam generator element 52 to the turbine element 54. As is known to those skilled in the art, the mass flow rate may be controlled by varying either the area through which motive fluid may enter the turbine or by changing the pressure of the fluid. If the turbine disposed in any particular power plant has a single admission arc therein, the area of fluid entry remains constant so that the only alternative available in such a case is to reduce the pressure of the fluid entering the turbine element. However, if there is disposed within the turbine element a plurality of admission arcs with each arc being separately connected to the steam generator and having a separate flow control apparatus associated therewith, both the area of fluid entry and the pressure of the fluid may be controlled. It is apparent however that, whatever the particular turbine inlet arrangement involved, effective control of the mass flow rate entering the turbine may be had by lowering the pressure of the fluid as it passes into the turbine inlet.

Flow control apparatus may be utilized to lower the pressure of the fluid entering the turbine inlet by varying the position of the plug relative to the valve seat. By modulating the clearance between the bottom of the valve plug and the valve seat, or as known to those skilled in the art, by varying the "lift", the pressure of the fluid entering the turbine inlet is reduced below the pressure of the fluid as it entered the flow control apparatus.

In the prior art it has been observed that flow control apparatus, such as control valve 10 disposed between steam generator and turbine inlet (FIG. 2), have experienced repeated vibration damage and encounter excessive noise levels. The apparent explanation for the vibration and excessive noise levels is that flow pulsating at the bottom of the valve plug and flow mixing of the fluid stream lines causes the vibration and noise levels to occur.

Referring to FIGS. 3A and 3B, diagrammatic views of the prior art flow control valves illustrating the phenomena causing excessive vibration and noise levels are shown.

In both FIGS. 3A and 3B, the lift "L" between the bottom of the valve plug and its valve seat is constant. Referring to FIG. 3A, during normal operation, that is, when the ratio of valve inlet pressure P1 to turbine inlet pressure P2 is less than a certain predetermined standard the following physical conditions are extant: for the given lift L and for the pressure ratio P1 to P2 being less than a predetermined standard, the flow stream lines pass from the valve chamber into the valve outlet substantially as shown in FIG. 3A at reference 67. That is to say, the flow stream lines pass through the narrow channel between the valve plug and the valve seat and generally follow along the boundaries of the valve conduits. Emperical observations have shown that the pressure at a point immediately below the bottom of the valve plug and indicated by reference numeral $P_b$ is less than the pressure $P_2$, the pressure of the fluid at the turbine inlet. It should be noted in this context however that the pressure $P_2$ at the turbine inlet is substantially equal to the pressure within the conduit approximately five pipe diameters downstream of the control valve. Thus, for purposes of discussion, it will be assumed that the pressure $P_2$, which denominates the inlet pressure to the turbine is substantially equal to pressure existing in the conduit five pipe diameters downstream from the flow control device. However, since the pressure $P_2$ is greater than the pressure at point $P_b$ immediately downstream of the valve plug, a back flow of fluid occurs, the flow illustrated by numeral 68 moving relative to the piping from the downstream direction toward the valve plug. This natural back flow 68 from the higher static pressure region $P_2$ (approximately five pipe diameters below the flow control device) toward $P_b$ (immediately downstream of the plug of the flow control device) causes, by viscous interaction, a dissipation of the velocity head of the motive fluid so that fluid passes through the narrow channel between the valve plug and the valve seat. Such viscous interaction dissipates the velocity energy of the fluid flow and prevents excessive vibration and noise levels from occurring.

Referring now to FIG. 3B, the situation which occurs during low load conditions when the pressure ratio P1 to P2 is greater than the predetermined standard is depicted. In this situation the fluid flow stream lines passing through the narrow channel between the bottom of the valve plug and the valve seat do not follow the boundaries of the outlet conduit but instead separate therefrom and collide beneath the valve plug, as illustrated by numeral 69 in FIG. 3B. The collision 69 of the motive fluid stream lines adjacent the outlet port of prior art flow control devices creates a closed vortex cavity 70 that is, in general, asymmetric to the axis 71 of the control valve and its associated outlet piping. As a result of the collision of the influent main streams as shown in FIG. 3B, the natural back flow 68 which occurs from the point downstream (FIG. 3A) is no longer permitted to interact with the influent main stream. Thus, the viscous interaction which dissipated the velocity head as depicted in FIG. 3A can no longer take effect. Further, turbulent fluid trapped within the closed vortex cavity 70 causes vortex excitation to the exposed underside of the control valve plug which induces excessive vibration to that valve plug. Also, high noise levels are thereby generated within the valve due to the collision 69 of the influent main streams.

Emperical observation has confirmed the existence of several general statements which may be made about the distribution of pressures within the flow described in FIG. 3B. First of all, it is generally true that the pressure P1 adjacent the valve chamber of the flow control device is always greater than the static pressure $P_2$ which occurs several pipe diameters downstream of the flow control device. (The pressure $P_2$ is also substantially equal to the pressure at the turbine inlet.) It has also been observed that the pressure, $P_w$, along the walls of the conduit adjacent the outlet of the flow control device is usually less than the pressure $P_2$ downstream of the flow control device.

Using the difference in pressures between the low pressure $P_w$ and $P_2$, it has been suggested that the natural back flow, which is choked off by the colliding main streams, be provided an alternative route. This solution is embodied and claimed in the application of D. Q. Hoover, Jr., Ser. No. 563,422, filed Mar. 28, 1975, filed concurrently herewith and assigned to the assignee of the present invention. As is disclosed in the Hoover application, fluid is conducted from the higher static pressure region $P_2$ through a tap 72A and the external conduit system 12 (FIG. 1) into the valve housing 16. The flow passes through the hollow valve plug 24 the openings 38 and introduced into the region directly beneath the valve plug 24. This artificial back flow, as described more fully in the above-mentioned copending application of D. Q. Hoover, Jr., by viscous interaction dissipates the velocity head of the influent main streams and in effect, separates the main streams so that they will be pushed to a position along the walls of the downstream conduit. Since for most applications, it may be said that the pressure $P_2$ is greater than the pressure $P_b$ immediately beneath the valve plug and is also greater than the pressure $P_w$ along the wall, the physical separation of the colliding main stream above described, may be effected.

It should be noted in this regard that any attempted solution which suggests utilization of high pressure fluid P1 taken from the valve inlet and conducted through the hollow valve plug to the area immediately below the valve plug to effect separation of the main streams is not workable. It is well known to those in the art that if the ratio of the pressure $P_b$ immediately beneath the valve plug within the closed vortex system to the pressure P1 at the valve inlet exceeds the Critical Pressure Ratio, supersonic flow phenomenon, with its attendant shock systems, would lead to excessive noise and vibration levels which could even more severely damage the flow control device. Therefore, the solution described and embodied in the application of D. Q. Hoover, Jr., which provides an external back flow of fluid having a pressure $P_2$ associated therewith and conducts that flow of fluid through the hollow valve plug and to introduce it into the region within the closed vortex to effect separation of the colliding main streams, presents a situation where the ratio of the pressures $P_b$ beneath the valve plug to the pressure $P_2$ does not exceed the critical pressure ratio.

However, it has been observed that the situation wherein the pressure $P_2$ is not at all times greater than the pressure $P_b$ immediately beneath the valve plug. In those cases thre are found situations wherein the pressure $P_b$ in the vortex cavity (and therefore the pressure in the valve plug cavity 34) exceeds the pressure $P_2$ a predetermined number of pipe diameters downstream and a potentially catastrophic situation can be engendered. Due to openings 38, the pressure within the valve plug cavity 34 is substantially equal to $P_b$. If the pressure $P_b$ in the closed vortex cavity that lies immediately below the hollow valve plug exceeds the pressure $P_2$ lying downstream several pipe diameters, and, if a conduit bypass 12 exists which connects the hollow valve plug cavity 34 to that portion of the outlet conduit downstream of the flow control apparatus, a potentially disastrous counterflow is created wherein fluid from the relatively higher pressure region $P_b$ moves from the hollow valve plug cavity 34, through the bypass conduit 12 and into the outlet conduit piping downstream of the flow control valve. If this counterflow occurs, the valve would, in effect, be blocking itself, and flow of all motive fluid from the steam generator to the turbine would cease. As a result, a turbine overspeed condition could be generated.

In order to forstall any possibility of the potentially destructive counterflow above described, this invention disposes within the backflow bypass conduit 12 the pressure actuator valve 14. Referring again to FIG. 1 and also to FIG. 4, the pressure actuator 14 comprises a plunger 72 and disc 73 biased by suitable means such as a spring 74 toward a position wherein the plunger totally blocks the opening 40 of the bypass conduit 12 into the hollow valve plug chamber 34. The spring force is selected such that the force of the spring can be overcome by the force of fluid with pressure $P_2$. Thus in the normal situation described in the copending Hoover application, the actuator plunger 72 and disc 73 would be open so as to permit communication with that portion of the outlet conduit wherein the pressure $P_2$ is extant and the valve plug chamber 34. Thus, the artificial back flow from the tap 72A downstream of the flow control apparatus through the back flow external conduit 12 through the opening 40 and into the valve plug chamber 34, through the openings 38 in the valve plug 24 and into the region immediately below the valve plug can be continued. If however the pressure in the downstream region were to become lower than the pressure needed to overcome the spring force, as would be the case if the pressure downstream were to decrease below the pressure within the hollow valve plug cavity, the plunger of the actuator 14 would respond to the bias force 75 of the spring 74 and close to prevent the potentially disastrous back flow from occurring.

By the provision of the actuator 14 in the housing 16 of the flow control device 10 embodying the teachings of this invention an external bypass from the pressure region $P_2$ through the hollow valve plug 34 into the region beneath the valve plug 24 can be operative during those periods when the pressure $P_2$ exceeds the pressure in the vortex cavity; however the pressure $P_2$ to decrease below the pressure within the vortex cavity actuator 14 would prevent the potentially diastrous counterflow described by blocking the external bypass conduit. It is understood, of course, that the actuator 14 need not be placed in the position shown in FIG. 1, that any location serving to block the back flow bypass conduit in the conduit at any point between the region $P_2$ and the hollow valve plug 34 is within the contemplation of this invention.

I claim:

1. In a flow control apparatus having a casing with a valve plug movably disposed therein, an internal cavity disposed within said plug, said plug having a substantially axial bore therethrough permitting communication between said internal cavity and a area immediately beneath said valve plug, and external conduit means for conducting fluid from a region having a pressure therein higher than the pressure beneath said valve plug into said internal cavity, wherein the improvement comrpises:

means associated with said conduit means for isolating said internal chamber from said region when said pressure in said internal cavity exceeds the pressure in said region.

2. The apparatus of claim 1, wherein said isolating means are disposed within said conduit means.

3. The apparatus of claim 1, wherein said means comprises a pressure actuator movable from an open to a closed position and biased to close when the pressure within said internal cavity exceeds the pressure within said region.

4. The apparatus of claim 3, wherein said actuator is disposed within said conduit means next adjacent to said internal cavity.

5. The apparatus of claim 3, wherein said conduit means communicates with said internal cavity through an orifice, and wherein said actuator comprises a plunger member, a disc mounted to said plunger, said disc sized larger than said orifice, and means for biasing said disc to a position covering said orifice, said disc responding to said biasing means by moving to completely cover said orifice when said pressure within said internal cavity exceeds said pressure within said region.

* * * * *